United States Patent [19]

Fritsch

[11] Patent Number: 5,028,950
[45] Date of Patent: Jul. 2, 1991

[54] DUAL STAGE 3D PRINTER

[75] Inventor: Robert E. Fritsch, Gainesville, Ga.

[73] Assignee: Lentec Corporation, Duluth, Ga.

[21] Appl. No.: 482,160

[22] Filed: Feb. 20, 1990

[51] Int. Cl.$^5$ ............................................. G03B 35/08
[52] U.S. Cl. ........................................ 355/22; 354/115
[58] Field of Search ................... 355/22, 77; 354/114, 354/115; 352/86

[56] References Cited

U.S. PATENT DOCUMENTS

| | | | |
|---|---|---|---|
| 3,768,903 | 10/1973 | Steinberger et al. | 355/41 X |
| 3,895,867 | 7/1975 | Lo | 355/22 X |
| 3,953,869 | 4/1976 | Wah Lo et al. | 354/115 |
| 4,903,069 | 2/1990 | Lam | 355/22 |

Primary Examiner—L. T. Hix
Assistant Examiner—D. Rutledge
Attorney, Agent, or Firm—Brumbaugh, Graves, Donohue & Raymond

[57] ABSTRACT

A two-stage 3D printer comprises an edit stage in which a key subject is selected and image color data and key subject registration data are generated from negative 2D images and a print stage in which those data are used to optimize exposure of the 2D images and to provide key subject registration of the 2D images on lenticular print material. Exposure control and key subject registration in the print station are fully automated. The only required operator intervention in the operation of the printer is selection of a key subject of the photographic scene in one of the 2D images at the edit station.

10 Claims, 7 Drawing Sheets

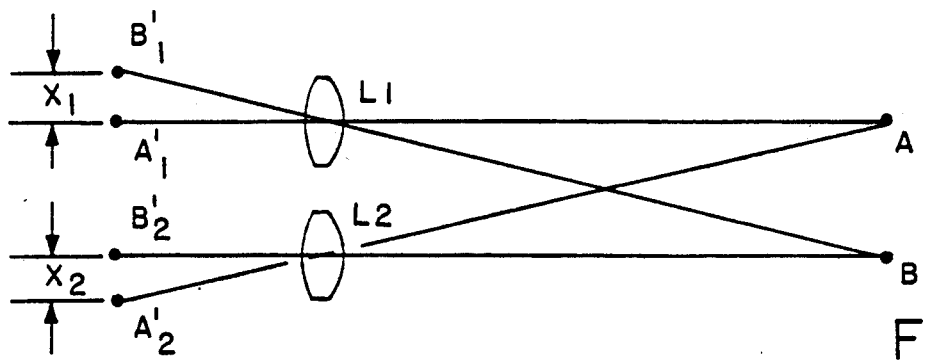
FIG. IA
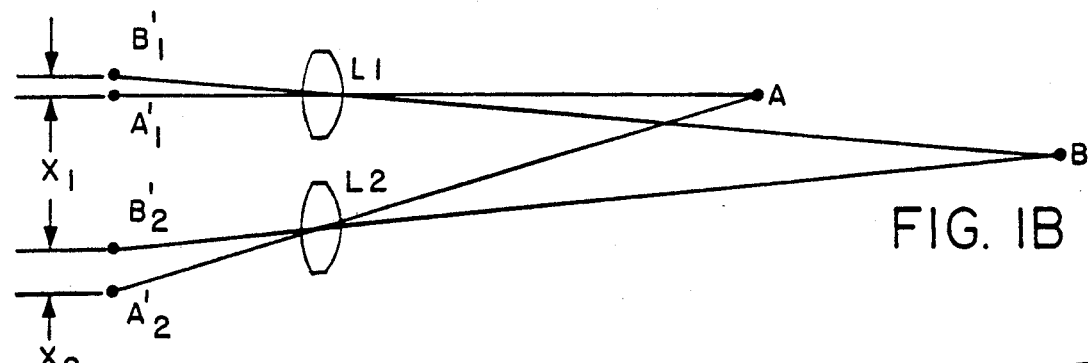
FIG. IB
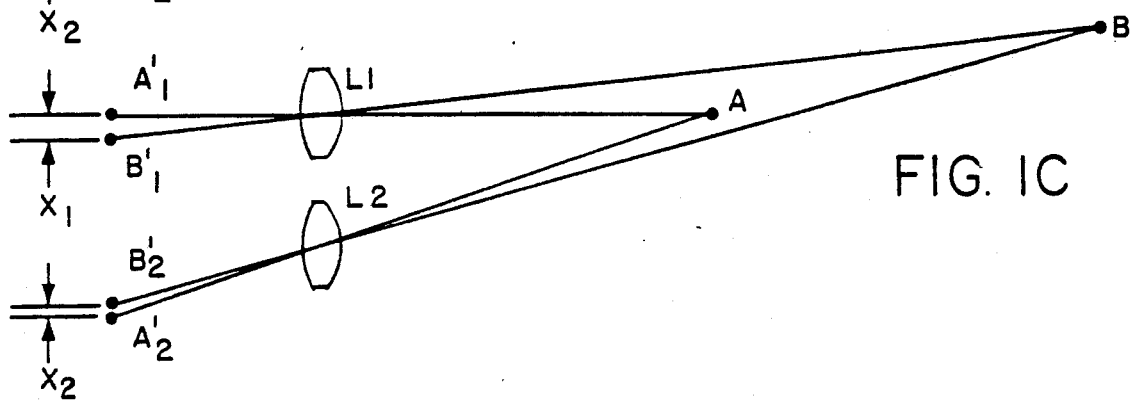
FIG. IC
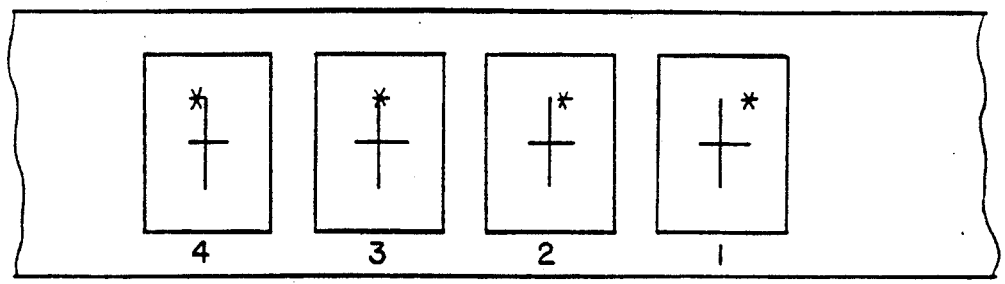
✶ = KEY SUBJECT
FIG. 2

DUAL STAGE 3D PRINTER

BACKGROUND OF THE INVENTION

In a panoramic parallax stereogram, a plurality of two-dimensional (2D) views of a scene are recorded from a number of horizontally spaced-apart vantage points. The recording medium is commonly photographic film. The recording camera may be a single frame/single lens device with exposures made by translating the camera horizontally through a series of equally spaced vantage points from each of which the scene is photographed. Other techniques include photographing the scene using a multilens camera, a motion picture camera which is translated horizontally (during a short exposure burst of frames), a number of side-by-side cameras, and other commonly used methods. Having recorded the series of 2D images (normally on color negative film), it remains to combine these images into a final positive image for three-dimensional (3D) viewing. While several techniques are available for making 3D prints, the method used in the present invention employs lenticular technology, in which the 2D images are recorded in a photographic emulsion that is located behind a transparent lens sheet composed of vertically oriented, adjacent cylindrical lenses (lenticules). Each 2D image is "line-formed" —i.e., elements of all of the 2D images are contained within fine vertical lines behind each lenticule. In the final composing (exposure) of the composite image, the 2D frames are sequentially projected through the lenticular sheet over a series of horizontal angular zones. When viewing the composite image, the 2D frames will "feed back" to the viewer in the same angular zones in which they were originally exposed. Depending on the placement of the viewer's eyes, each eye will see only one of the original 2D frames, with each eye receiving a different frame and with the two frames viewed comprising a stereo pair. This entire process of recording the 2D frames and the final composing of the end product has been described in considerable detail in U.S. Pat. Nos. 3,895,867 (Lo, July, 1975) and 3,953,869 (Lo et al., April, 1976), to which reference may be made for a detailed description of techniques for composing 3D prints from 2D images on lenticular print material.

The 3D effect results solely from the difference in the horizontal displacement of points in the picture (parallax) with respect to objects in some reference plane in the two 2D frames (stereo pair) being seen by the viewer. The viewer's eyes and brain interpret and translate this parallax information into depth perception. Two frames and two eyes are required to complete this cycle.

A further understanding of parallax in the recorded frames can be obtained by reference to FIG. 1 where two spaced-apart lenses (L1 and L2) of equal focal length are shown imaging two points (A and B) as A' and B'. Three arbitrary spatial locations of A and B are shown in FIGS. 1-A 1-B, and 1-C. In FIG. 1A, A and B are placed an equal distance from the lenses with A on the optical axis of L1 and B on the optical axis of L2. $x_1$ is clearly equal to $x_2$ with B imaging on the same side of A from both lenses. In FIG. 1B, $x_2$ is greater than $x_1$, with B again recording on the other side of A. FIG. 1C demonstrates a location of A and B producing an $x_1$ greater than $x_2$ with B imaging on one side of A from L2 but on the other side of A from L1. This horizontal shift in image points as seen through lenses located in horizontally displaced vantage points will be collectively referred to as parallax.

In producing a panoramic parallax stereogram the number N of 2D frames employed can range from two to a larger number—e.g., 32. The optimum number of frames used is determined by such factors as the size of the final print, the anticipated viewing distance to the print, the spatial frequency of the cylindrical lenses in the print material, and the resolving power of the photographic emulsion. As a general statement, the larger the print and the longer the viewing distance, the lower the spatial frequency of the lenticules and the greater the number of 2D frames required. The greater number of 2D frames is required in order to reduce the angular width of the "feedback" zone of each frame which is needed at the greater viewing distances. Increasing the number of 2D frames in turn requires an increase in the width of each lenticule in order to stay within the recording capability of available photographic emulsions. For small prints up to say 5×7 inches in size (intended to be viewed at close, hand-held distances), four 2D frames are commonly recorded behind the lenticular surface, which may have a spatial frequency in the order of 200 lenses per inch; i.e., each lenticule is 0.005 inches wide. This provides a line width of 1.25 mils (32 microns) for recording a verticle element of each of the four frames as an image band in the photographic emulsion under each lenticule.

In recording the initial 2D images (of say an outdoor scene), each lens can be considered to record an infinite number of "object planes" in the scene from the nearest object and out to infinity (or to the furthest object in the scene). In combining the 2D images into the final lenticular stereogram, a particular plane is selected to appear (to the viewer) to lie in the plane of the print. Other planes will appear to be either in front of the print plane (foreground objects) or behind the print plane (background objects). In the object plane selected to appear to lie in the plane of the print, there is normally a prominent object, which will be referred to as the "key subject." FIG. 2 portrays (as an example) a 4-frame image set (N=4) to be used to compose a final stereogram. The asterisk (*) in each frame (1, 2, 3 and 4) is the image of the key subject (e.g., the nose of a person standing at mid-range in the scene). The stereo pairs (for subsequent viewing by the right and left eye of the viewer, respectively) are 1-2, 2-3, 3-4, 1-3, or 2-4.

Composing of the final stereogram is carried out by a printer. One task of the printer is to project the 2D frames across the assigned angular exposure zones to the lenticular recording material. While this may be accomplished through a series of "step and repeat" static exposures, the technique preferably used is either intermittently or continuously scanning, which is clearly explained in the patents referred to above and is also illustrated in FIG. 3. Again a set of four negative photographic images (#1, #2, #3, and #4) on a film strip is depicted as an example. Each negative image in sequence, beginning either with #4 and scanning left to right or beginning with #1 and scanning right to left, is separately projected by the enlarging lens onto the lenticular print film and scanned through an angle equal to the acceptance angle α of the lenticules (conventionally, α=30°) divided by the number N of images. Thus image #4 is scanned through an angle from −15° to 7½° by moving the film strip, the lens and the lamphouse proportionately from left to right. After all of the negative images have been scanned into the print film, the film emulsion bears the latent images of elements of all four negative frames as side-by-side image bands under the lenticules. The images under each lenticule are elements of each of the four frames occupying a width w equal to the total width W of the lenticule divided by the number of frames N (w=W/N).

The only correct way to understand the recording optics is to analyze the two discrete (and independent) imaging actions. In the first imaging action, shown at the left as "#1 (macro)" in FIG. 4, the enlarging lens images the 2D negative film frame on the surfaces of the lenticules. Consider it as an aerial image or better still as a modulated pattern of light with each $\Delta x$, $\Delta y$ piece of lenticle receiving a given intensity and color illumination. It must be clearly understood that during the scanning exposure of each 2D frame, proportional motion of the film frame and the enlarging lens produces an absolutely stationary aerial image arriving at the lenticular surface at all angles during the scan. The only thing changing during the scan are the angles at which the aerial image arrives at each point on the lenticular surface. In the second imaging action, shown in the center as "#2 (micro)" in FIG. 4, the lenticule (cylindrical lens) unidirectionally images the exit pupil of the enlarging lens into the focal plane of the cylindrical lens )plane of the photographic emulsion). This second imaging action "line-forms" a vertical element of the frame into its assigned zone behind each lenticule. The "object" in this second (micro) imaging action is the exit pupil of the enlarging lens. As seen by any small $\Delta x$, $\Delta y$ area of a lenticle it appears as a generally diffuse, uniformly illuminated disc whose color and intensity vary as a function of the content of the aerial image as seen from the $\Delta x$, $\Delta y$ area under consideration. The cylindrical lens images in only one direction (at right angles to its long axis), which produces a generally elliptical exposure profile across the width e of the line image. This results directly from the area of the disc increasing from 0 at zone 140 to a maximum at zone 141 and back to 0 at zone 142 (elliptical function). A second result of the unidirectional imaging is that no detail is recorded across the line width e while any detail in the aerial image down the long axis of the lenticle is preserved. The line width e is determined as follows (refer to the right sketch in FIG. 4):

Let: $\alpha$ = acceptance angle of the lenticle
$\beta$ = angle subtended by exit pupil from lenticle
$d_{EP}$ = diameter of exit pupil
s = long conjugate distance
f = lens focal length
$F_{no}$ = lens aperature (speed)
$m^1$ = enlargement ratio $$s = f(1 + m^1) \quad (1)$$

$$\tan \beta = \frac{d_{EP}}{s} = \frac{d_{EP}}{f(1 + m^1)} \quad (2)$$

$$F_{no} = \frac{f}{d_{EP}} \text{ (definition)} \quad (3)$$

$$d_{EP} = \frac{f}{F_{no}} \text{ (from 3)} \quad (4)$$

$$\tan \beta = \frac{f}{f \circledR F_{no} \circledR (1 + m^1)} = \frac{1}{F_{no}(1 + m^1)} \quad (5)$$

$$\beta = \arctan \frac{1}{F_{no}(1 + m^1)} \quad (6)$$

For example, using an F/5.6 lens and an enlargement ratio of 10, $\beta$ is seen to be 0.93°. Assuming lenticles with an acceptance angle $\alpha$ of 30°, $\beta$ is approximately 3% of the full acceptance angle—hence the need to scan (move the exit pupil over a range of angular positions) in order to expose 25% of W (assuming a 4-frame image set). The dimension e shown in the center view of FIG. 4 is 3% of 0.005" or 0.00015" (3.8 microns). The generally elliptical intensity within this fine line becomes essentially unimportant during the scan because of the continuously overlapping exposures it produces. The first function of the printer, then, is the sequential, proportional scanning of each 2D frame through a defined angular zone resulting in the line-forming of each frame.

A second and equally important function of the printer is the creation of the viewer illusion that the key subject plane appears to lie in the plane of the print material with foreground and background objects appearing to be in front of and behind the print plane, respectively. This function requires the performance of two actions by the printer and/or the printer operator: 1) The designation (typically by the operator) of the key subject which is to be presented to the viewer as lying in the plane of the print. 2) The registration by the printer of the key subject from all 2D frames at the print plane. This means that the key subject in the aerial image from each 2D frame must strike the plane of lenticular surface at the same x,y coordinate location. When the key subject from all 2D frames is registered in the plane of the print material, the viewer will then perceive this key subject to lie in the plane of the stereogram with foreground and background objects appearing in front of and behind the plane, respectively. This key subject registration is also shown in FIG. 3.

In one of the methods heretofore employed in printers to accomplish the second printer function just discussed, key subject registration, the first frame of the 2D set is picked up by a video camera and presented to the printer operator as a positive image on a video monitor. The operator then designates the key subject (to be printed in registration) using a screen cursor controlled by a joystick, roll ball, or other controller. Simultaneously, another frame of the set is analyzed for color content and density, from which the required lamphouse intensity and color and color balance are computed. After setting the lamphouse to the computed red, green, and blue light intensity and balance, the printing cycle is ready to begin. The first frame of the set is printed with no positioning correction, following which the printing is stopped to permit an operator-controlled registration cycle. A mirror is introduced into the printing path to deflect the aerial image to a secondary plane at 90° to the print plane. A CCD video camera (without a lens) is moved by an x,y stage to the coordinate location of the designated key subject. The key subject image is captured by the photosensitive surface of the video camera, placed in digital memory (frame grabber), and presented to the operator as a positive video image on the monitor. The film is then advanced to the second frame of the 2D set, which is again intercepted by the mirror and the key subject video camera and presented on the monitor as a "live" negative image.

The operator then uses a controller to move the film in the printer to bring the key subject in the second frame into registration with the "stored" location of the key subject in the first frame. (When coordinate registration is achieved, the negative video of the second frame cancels the positive video of the stored first frame and the screen is "greyed out.") Having achieved key subject alignment of frame 2 with respect to frame 1, the mirror is removed and the second frame is printed. This procedure is repeated for all remaining frames. The printing is seen to involve a serial operation of print, register, print, register, print, register, and print, the operator being required to perform the actual frame-to-frame registration. The printing time for each picture is typically 12 to 15 seconds, depending upon the skill of the operator. The prints-per-hour rate is in the order of 250. The printing is also very operator-intensive with operator fatigue being a significant negative factor.

An optional approach used heretofore uses a complete registration cycle for all 2-D frames to be printed (again with manual frame-to-frame registration by an operator with all registration data stored digitally) after which a printing cycle is performed. Total cycle time for each print remains high—in the range of 11 to 14 seconds—again depending upon the skill and fatigue level of the operator.

SUMMARY OF THE INVENTION

The 3D printer of the present invention employs a unique approach to color analysis and key subject registration by utilizing two stages in a functionally parallel mode—an edit station and a print station. The only operator action is the designation of the key subject, while the required frame-to-frame registration data are produced electronically using a sophisticated image-processing system. Total time per print is reduced to four to five seconds with far less dependence on an operator.

In particular the invention is a dual-stage 3D printer for forming latent line-formed photographic images on lenticular print film from a set of N frames of negative images $N_1$—$N_n$ of a scene in which a selected key subject of the scene is to be formed in the developed photographic image so as to appear to a viewer to be in the plane of the print. In the edit station, image content data signals are generated periodically and frame-by-frame that are indicative of the densities of a matrix of zones of the images of each frame $N_1$—$N_n$ of the set. The image content data signals of one of the frames $N_1$ are generated first and are visually displayed for selection by an operator of a key subject area of the image. The image content data signals for the operator-selected key subject area of frame $N_1$ are processed to produce identifier signals distinctly indicative of the content and location of the key subject area of frame $N_1$. Next, selected portions of the image content data signals for each of the other frames $N_2$—$N_n$ are generated and compared seriatim by correlation with the identifier signals, and registration signals indicative of the location of the key subject area of the images of each of the frames $N_2$—$N_n$ are generated and stored. In the print station, frame $N_1$ is generated from a preset location, and each frame $N_2$—$N_n$ is positioned automatically in response to the registration signals for the individual frames $N_2$—$N_n$, such that the key subject of each of the frames $N_2$—$N_n$ is in registry in the plane of the print film with the key subject in frame $N_1$.

In a preferred embodiment the image content data are generated in the edit station by sequentially projecting diffuse light through each of the frames $N_1$—$N_n$ and a lens onto the photoreceptor of a CCD video camera. The image content data signals and identifier signals are derived from the output signals of selected arrays of pixels of the CCD camera and are indicative of the optical densities of a matrix of zones of the entire frame and a matrix of zones of the key subject area, respectively.

In addition to providing the image content data for use in establishing key subject registration in the print station, the edit station may, advantageously, also include means for separately interposing red, green and blue filters in the path of the negative image of one of the frames projected to the video camera so as to provide image color data signals indicative of the densities of red, green and blue components of the images in a matrix of zones of that frame of the set and, of course, of the entire set of images. The image color data signals are processed and used in the print station for controlling the red, green and blue components of the imaging illumination projected into the print film.

The frames of the negative set to be printed are, preferably, arranged closely together side by side on a film strip having a longitudinal axis x. The registration signals for each frame $N_2$—$N_n$ include an x-axis component $\Delta x$ indicative of the difference along the x axis between the position of the key subject area in frame $N_1$ and the position along the x axis of the key subject area in the respective frame $N_2$—$N_n$. Both the edit station and print station include a movable film gate receiving the film strip in a fixed position and a drive for advancing it frame by frame in response to x-axis control signals, the x-axis control signals for moving the film gate of the print station for each frame $N_2$—$N_n$ being the algebraic sum of the x-axis control signal for moving the film gate of the edit station for that frame and the x-axis component $\Delta x$ of the registration signals for that frame. Registration of the key subject area in the y-axis direction (orthogonal to the x axis) is obtained in the print station by moving the projecting lens in the y-axis direction in response to a y-axis component $\Delta y$ of the registration signals for each frame $N_2$—$N_n$.

The negative images to be printed may be assembled from many film rolls spliced together to form a continuous strip, each set of 2D images being marked by a machine-readable marker located in a predetermined relation to frame $N_1$ of each set. The edit station includes a detecting device for reading the marker on the strip and producing a signal indicative of the position of frame $N_1$ of each set and a film advance device for advancing the film to position frame $N_1$ of each set in the image path from the light source to the video camera in response to detection of the marker for that set.

The edit station and print station preferably include separate film advance devices for automatically advancing the film strip after processing of each image set. A slack loop station between the edit station and the print station holds a portion of the strip containing a varying number of image sets so that the print station can process prints on fully automated constant-time cycles while the edit station can operate on variable-time cycles involving operator intervention for key subject selection.

For a better understanding of the invention reference may be made to the following description of an exemplary embodiment, taken in conjunction with the accompanying drawings.

DESCRIPTION OF THE DRAWINGS

FIGS. 1A, 1B and 1C are diagrams illustrating the concept of parallax, as described above;

FIG. 2 is a diagram of a set of 2D photographic images taken from horizontally spaced vantage points illustrating the different location of the key subject image on each frame;

DESCRIPTION OF THE PREFERRED EMBODIMENT

Figure 5:
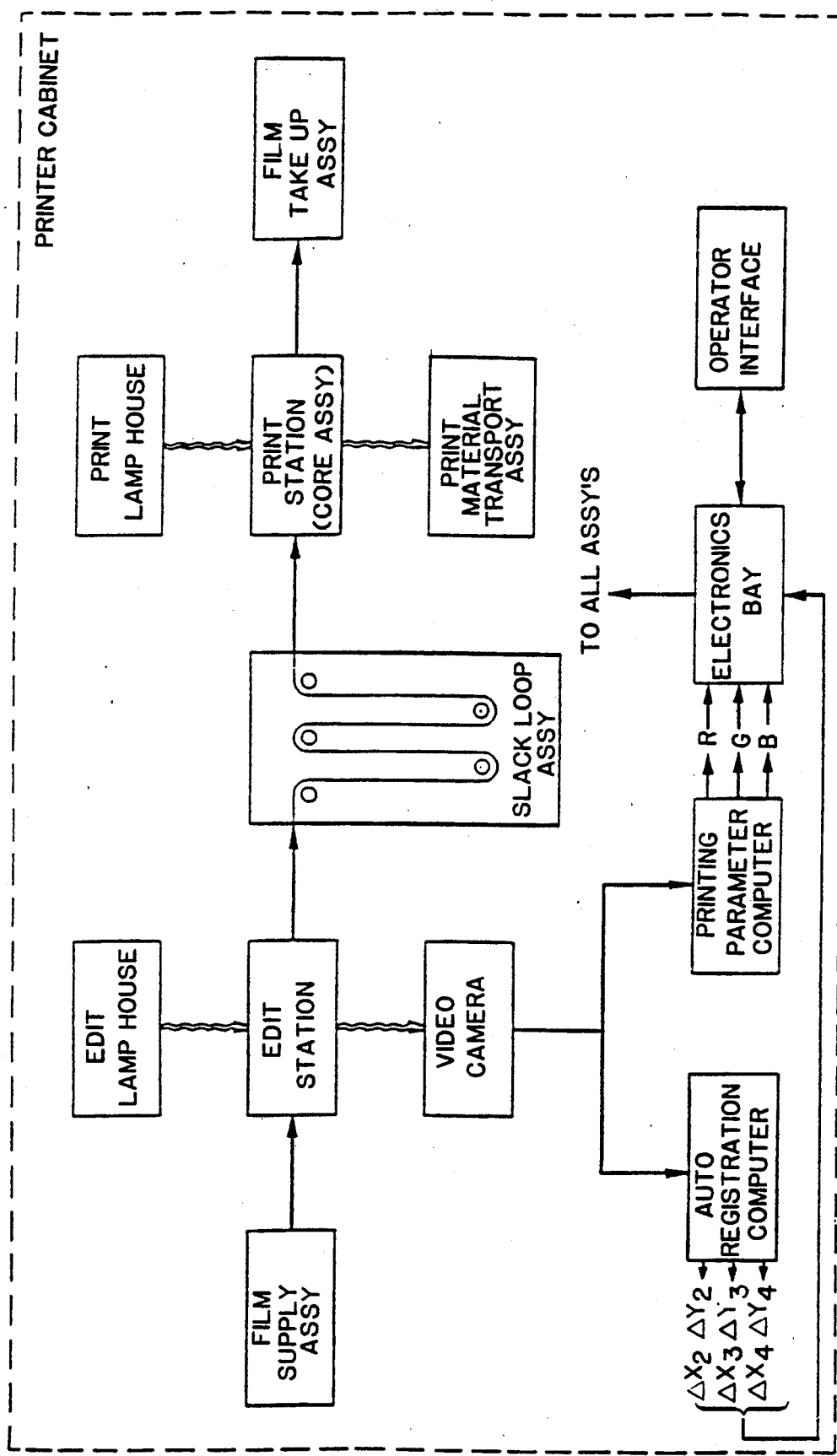
FIG. 5 is a block diagram of the main assemblies of a printer constructed in accordance with the invention.

The major components of the dual-stage printer are shown in FIG. 5. In functional terms the edit station determines the lamphouse printing parameters (red, green, and blue light intensity) for each negative set to be printed and the registration data for printing each of the 2-D frames of the set with precise registration of the key subject in the plane of the print material. The operation of the edit station is described below for a set of four 2D frames (N=4), but the techniques described are applicable to any number of input 2D negative images from two through n. By gathering in the edit station all of the data necessary to successfully print a panoramic parallax stereogram (lamphouse settings and key subject registration values), printing can continue uninterruptedly and automatically in the print station.

The film to be printed is generally multiple rolls of color negative film which have been spliced together, processed, and edge-notched to identify each series of frames that make up one set of 2D images to produce the stereogram print. This large roll of spliced film rolls is loaded on the printer at the Film Supply Assembly, and a leader (film without images) is threaded through the Edit Station, Slack Loop Assembly and Print Station and attached to an empty take-up spool on the Film Take-up Assembly. During operation of the printer, the film is advanced from image set to image set in the Edit Station where printing parameters and key subject registration values are automatically determined. The major functional components of the Edit Station are the Edit Lamphouse, Video Camera, Auto-registration Computer, and Printing Parameter Computer. All necessary data required to print the stereogram at optimum density and color and in precise key subject registration are stored in digital memory for subsequent use at the Print Station. The Slack Loop Assembly is a passive device which stores a variable number (up to 20) of image sets to be printed. (As will later become apparent, the Print Station operates fully automatically, whereas the Edit Station involves operator intervention for selection of the key subject, and the Slack Loop Assembly allows time differences between processing in the Edit Station and Print Station to be compensated for.)

The Print Station provides for the precision proportional scanning of all 2-D images in each set. The Print Lamphouse is automatically adjusted to the computed (and stored) R, G, and B (red, green and blue) intensity values for each print while the Print Material Transport Assembly provides for the metered advance of the lenticular print material from a supply roll and take up onto a roll of exposed print material. All machine functions are controlled by a computer and electronics located in the Electronics Bay. The Operator Station (see FIG. 6) contains two video displays, a key pad, a roll ball and other controls (not shown) necessary for all operator functions. Video display I displays the 2D frame for operator selection of the key subject. Video display II presents text, menus and operator prompts.

All film manufacturers expose a latent image code along one edge of the film. Upon processing the film, a machine readable code (DX code) is produced. The Printer uses the DX code to identify the specific film type to be printed. In processing the film for the printer, small edge notches are punched on the edge of the film opposite the DX code. Each notch is precisely located with respect to each 4-frame image set and will be used by the printer to accurately stop the film and locate it in film gate in both the Edit and Print Stations.

Figure 7:
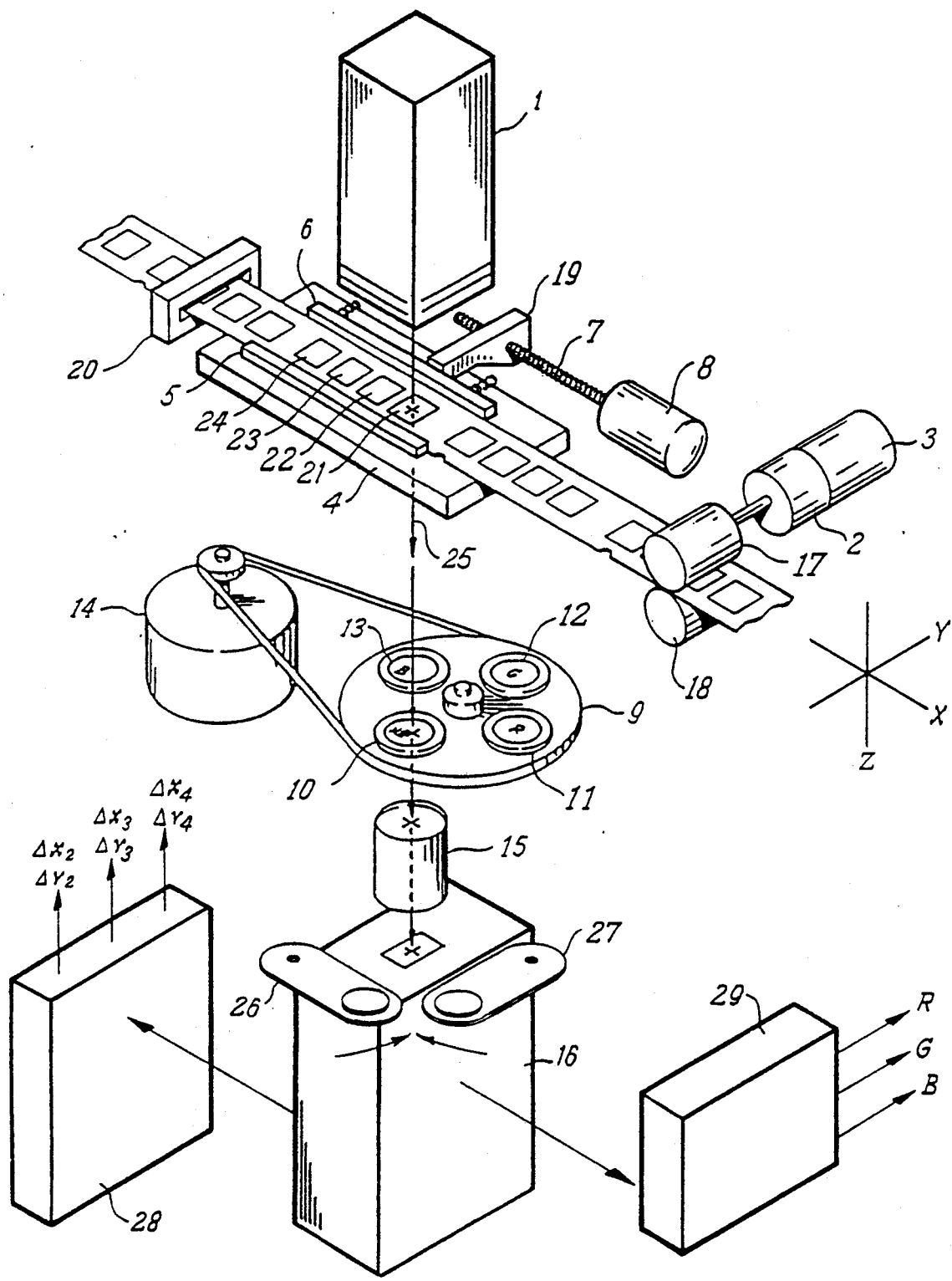
FIG. 7 is a pictorial view, in generally schematic form, of the edit station of the embodiment of FIG. 5.

One complete editing cycle in the Edit Station—see FIG. 7—begins with the advance of the film from the previous image set to the next set to be edited. A film advance motor 2 is turned on to advance the film along the x axis using a film drive roller 17 and an opposing pressure roller 18. A notch detector and DX code reader 20 senses the film as it is advanced. The film identity is read and placed in digital memory. Upon detection of the locating notch, the film is advanced a previously calibrated (metered) distance and stopped precisely located in film gate 4. Advance metering following notch detection is accomplished by counting pulses from a film advance encoder 3. Not shown in FIG. 7 is a pressure plate located above the film that is released during the film advance and closes to clamp the film in a controlled z-axis location on the film gate 4. A fixed edge guide 5 and a movable pressure guide 6 maintain controlled angular alignment of the film during both film advance and after clamping by the pressure plate. There are four open windows in the film gate 4 and four matching windows in the pressure plate (not shown). The frame set to be edited contains images 21 through 24. The film gate 4, notch detector and DX code reader 20, and the film advance components 2, 3, 17, and 18 are parts of an integral unit which is mounted to a linear positioning stage (not shown) and can be positioned at any instructed position along the x axis by a stepper motor 8, a lead screw 7, and a driven nut 19, which is mechanically attached to the gate 4. The gate 4 is initially positioned to center the frame 21 on the system optical axis 25.

Frame 21 is uniformly and diffusely illuminated by an edit lamphouse 1. The lamphouse 1, a filter wheel 9 (with path filters neutral density 10, red 11, green 12, and blue 13), lens 15, insertable neutral density filters 26 and 27, and a video camera 16 comprise a precision densitomerter that permits "point density by color" measurements of the film. The filter wheel 9 is rotated 90° clockwise by a stepper motor 14, placing the red filter 11 in the optical path. The frame 21 is imaged (through red filter 11) by the lens 15 onto the CCD photoreceptor of the video camera 16. The video camera 16 is calibrated to respond linearly to the illumination transmitted through the full range of expected film densities. Of the CCD pixel array of 480×512, a square array of 400×400 pixels is used for the film density calculations. Each pixel in the 400×400 array is digitized to an 8 bit number with a value of 1 to 255 The 400×400 matrix is then reduced to a 10×10 matrix of digitized numbers in which the number for each of the 100 total film zones is the average of the 40×40 91600) pixels in each zone. A conversion is then made (through a lookup table) to a 10×10 matrix of density values. Film density is defined as the log to the base 10 of 1 over the transmission, to wit:

$$T = I_o/I_i \tag{7}$$

$$D = \log_{10}(1/T) = \log_{10}(I_i/I_o) \tag{8}$$

where T=transmission, $I_i$=light intensity in, $I_o$=light intensity out and D=transmission density.

The full 10×10 matrix of red density values $D_{1R}$—$D_{100R}$) becomes one of the inputs to the printing algorithm.

The filter wheel 9 is rotated another 90° clockwise to place the green filter 12 in the optical path, and the above-described procedure is repeated to produce $D_{1G}$—$D_{100G}$. After another 90° rotation of the filter wheel 9, the blue filter 13 is used to produce $D_{1B}$—$D_{100B}$. The filter wheel 9 is advanced a final 90° to again insert neutral density filter 10 into the optical path. The total cycle time for gathering all density values by color for the 100 film zones is less than 1 second.

Figure 6:
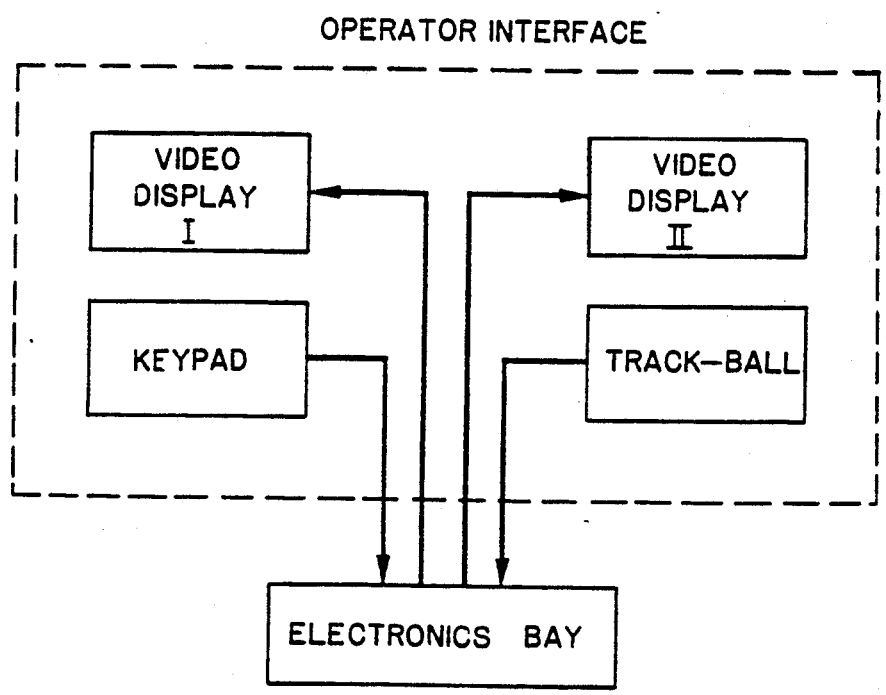
FIG. 6 is a block diagram of the operator interface assembly.

The insertable neutral density filters 26 and 27 have density values of 0.3 and 0.6, respectively, providing the ability to add to the filter 10 0, 0.3, 0.6, or 0.9 of neutral density to the path. Using the density data previously gathered, the computer now inserts additional filtration (if required) to provide the operator with an optimum image of frame 21 on TV monitor I of the operator interface (FIG. 6). The live video signal is also inverted to produce a positive image of the color negative frame—frame 21 (sometimes referred to herein as "frame N1") remains in the optical path. The operator selects a key subject in frame $N_1$ that is to be printed in registration in the Print Station (i.e., made to appear in the stereogram as lying in the plane of the print and with other objects appearing to lie in front of or behind the registered plane). The operator uses the roll-ball control to place a square cursor (28×28 pixels referenced to the CCD video camera sensor) over the selected key subject in frame $N_1$ and presses an ENTER key. The Auto Registration Computer 28 "models" the density value of each pixel within the 28×28 key subject area and stores it in memory. This "model" will be used during the auto-registration cycle to find the x,y coordinate location of this key subject in all subsequent frames $N_2$, $N_3$ and $N_4$ (22-24 in FIG. 7).

The stepper motor 8, lead screw 7, and driver nut 19 are used to move the film gate 4 along the x axis through the nominal frame-to-frame distance to center the next frame 22 on the optical axis 25. The key subject in frame 22 is now normally displaced from its coordinate location in frame 21. This results from a number of factors, such as film tracking errors in the original recording camera, lens centering errors in the original recording camera (if a multilens camera is used), distance variation from the recording camera to the key subject (magnitude of recorded parallax), and the separation of the vantage points from which the 2D frames were originally recorded. The Auto Registration Computer now does a "correlation search" in an area 55 pixels in height (along the y axis) and 95 pixels wide (along the x axis); the 55×95 pixel area is centered on the coordinate location of the key subject "model" from frame 21. (If a pattern match is not found in the 55×95 area, the search is expanded to a 75×150 area.) When the coordinate location of the key subject is found in frame 22, its location is recorded as a plus or minus deviation along both the x and y axis ($\Delta x2$, $\Delta y2$) from its location in frame 21. The system has the ability to resolve the coordinate location within 1/5 pixel spacing—i.e., approximately 1/2500 of the frame width. The coordinate deviation values are converted from pixel units to stepper motor steps prior to storing the values for subsequent use in the Print Station. The full sequence of events (advance film, search, and store) is repeated to obtain registration data for frames 23 and 24. No operator interaction is required beyond the initial selection of the key subject.

Following the selection of the key subject in frame 21, the computation of the printing parameters (print lamphouse settings) is initiated and completed during the auto registration cycle by the Printing Parameter Computer 29, based on the image color content data produced by the Edit Station. Knowing the location of the key subject in the picture, a color algorithm "weights" the density values in this area more heavily than other areas of the image in determining the optimum output for the printing lamphouse. In this respect the printer applies technology that is used in all modern computerized color printers to determine the amount of color and light required to expose the negative onto color print paper. The algorithm is a series of equations that corrects the color and density of the negative into either red, green, and blue printing times (exposure light level constant) or red, green, and blue light levels (time constant). As is known per se. The algorithm weights certain parts of the negative, such as the center and the lower right and left quadrants, more heavily than other areas. In the printer of the present invention, image content data are available for use in the printer in the form of a matrix of "area density by color" values coupled with the knowledge of which area contains the key subject of the picture. The key subject is often a person in the picture whose printing at optimum density and color balance are of prime importance to maximize the yield of superior printed images.

The full array of algorithm inputs consists of 100 area density values using red light (density matrix of the cyan emulsion dye), 100 area density values using green light (density matrix of the magenta emulsion dye), 100 area density values using blue light (density matrix of the yellow emulsion dye), the DX code identifying the film type, and the x,y, coordinate location of the key subject. The algorithm manipulates this data to produce the three outputs shown (FIG. 7) as R (red), G (Green), and B (Blue). These three outputs specify the red, green, and blue light intensity levels required from the printing lamphouse for optimum exposure of the print, and are stored in computer memory until the image set arrives at the Print Station, at which time a closed loop servo system sets color filtration in the lamphouse to these specified values.

Figure 8:
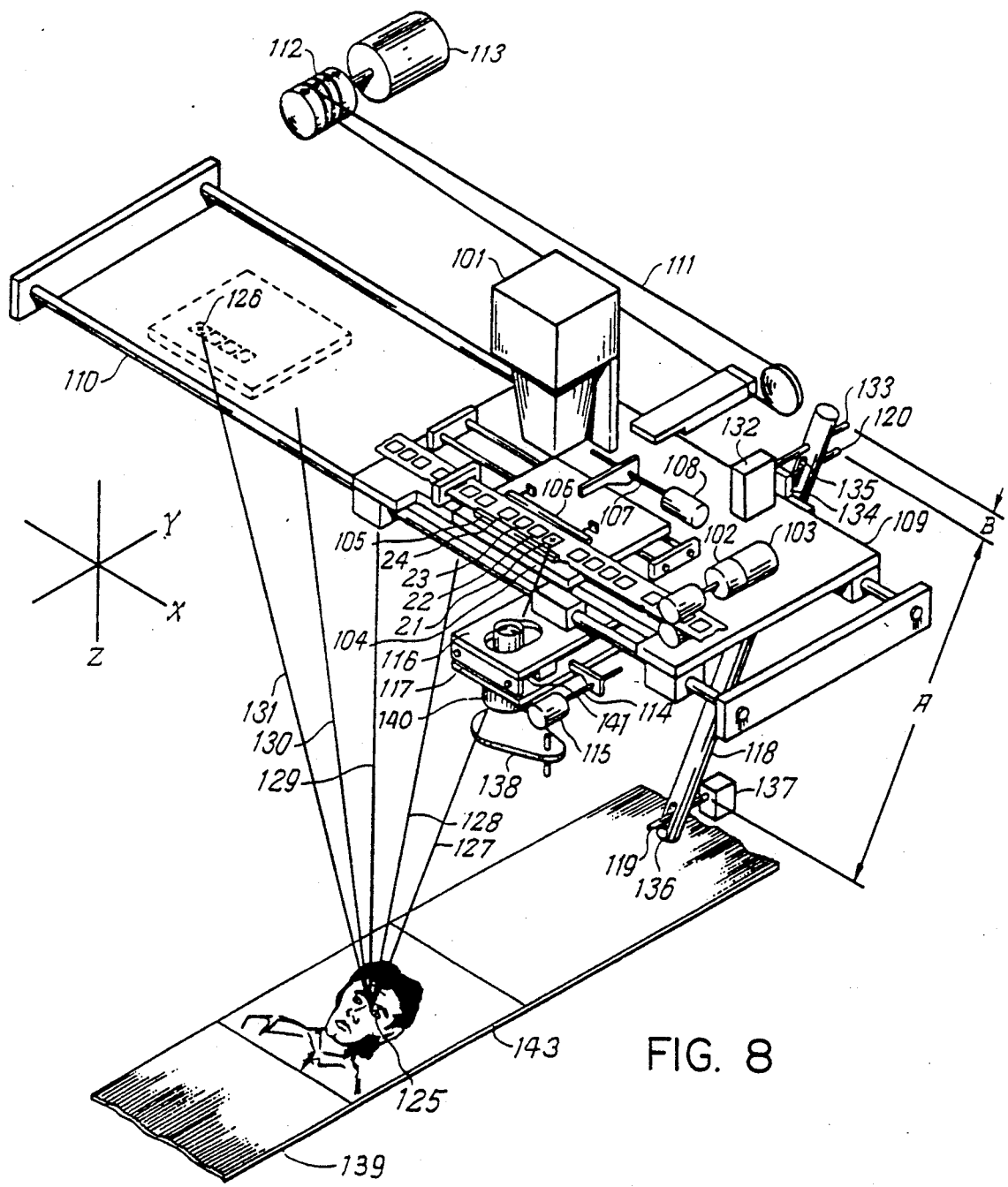
FIG. 8 is a generally schematic pictorial view of the print station of the embodiment of FIG. 5.

In the Print Station, with reference now to FIG. 8, the mechanism for advancing the film and holding it in a known position during the printing cycle is identical to the mechanism used in the Edit Station. Components 102, 103, 104, 105, 106, 107 and 108 are physically and functionally the same as the components 2, 3, 4, 5, 6, 7 and 8 of the Edit Station. In the case of the Print Station, however, the film gate 104 and its x-axis translating components (linear stage 142, lead screw 107, and stepper motor 108 are all mounted on a second x-axis translating carriage, the scan carriage 109. The scan carriage 109 (mounted on a linear stage 110) is positioned along the x axis by a cable 111, drum 112, and scan motor 113. The enlarging lens 140 is mounted on a plate 117 which is attached to a lens carriage 116 via a y-axis stage 141. The lens is positioned along the y axis by a lead screw 114 and a stepper motor 115. A lens carriage 116 moves along the x axis also using the linear stage 110. The lens carriage 116 is moved along the x axis by a proportioning arm 118, which is coupled to the scan carriage 109 (and hence indirectly to the film gate 104), the lens carriage 116, and to a fixed pivot point 119. A block 132 and a pivot shaft 133 permit the proportioning arm 118 to rotate freely in a plane defined by the axes x and z. The block 132 is attached to the scan carriage 109. A second pivot shaft 120 is connected to the lens carriage 116 by a block 134. A slot 135 permits the pivot shaft 120 to slide along the axis of proportioning arm 118 as the scan carriage 109 moves along the x axis. A third pivot shaft 119 is attached to a block 137 which is mounted in a fixed x-, y-axis coordinate location but is adjustable along the z axis. A slot 136 performs the same function as the slot 135. The distance from the pivot 133 to the pivot 120 (labeled B) and the distance from the pivot 120 to the pivot 119 (labelled A) are continuously changing as the scan carriage 109 moves along the x axis, but the ratio of A to B (A/B) remains constant. This ratio is adjusted so that A/B is equal to the optical enlargement ratio of the printer.

The enlarging lens 140 is a distortion-free design so that the enlarging ratio remains constant at any position of the scan carriage 109 along the x axis. The end result of this construction is that the aerial image of a film frame which arrives at the print location 143 remains fixed in space (both focus and its x, y coordinate location) during a full travel of the scan carriage 109. This is the direct result of the proportional motion of the lens carriage 116 introduced by the proportioning arm 118. In simpler terms, the lens is always maintained on an axis (a straight line) from the film frame being printed (e.g., frame 21) to the picture being exposed (e.g., 143).

Figure 3:
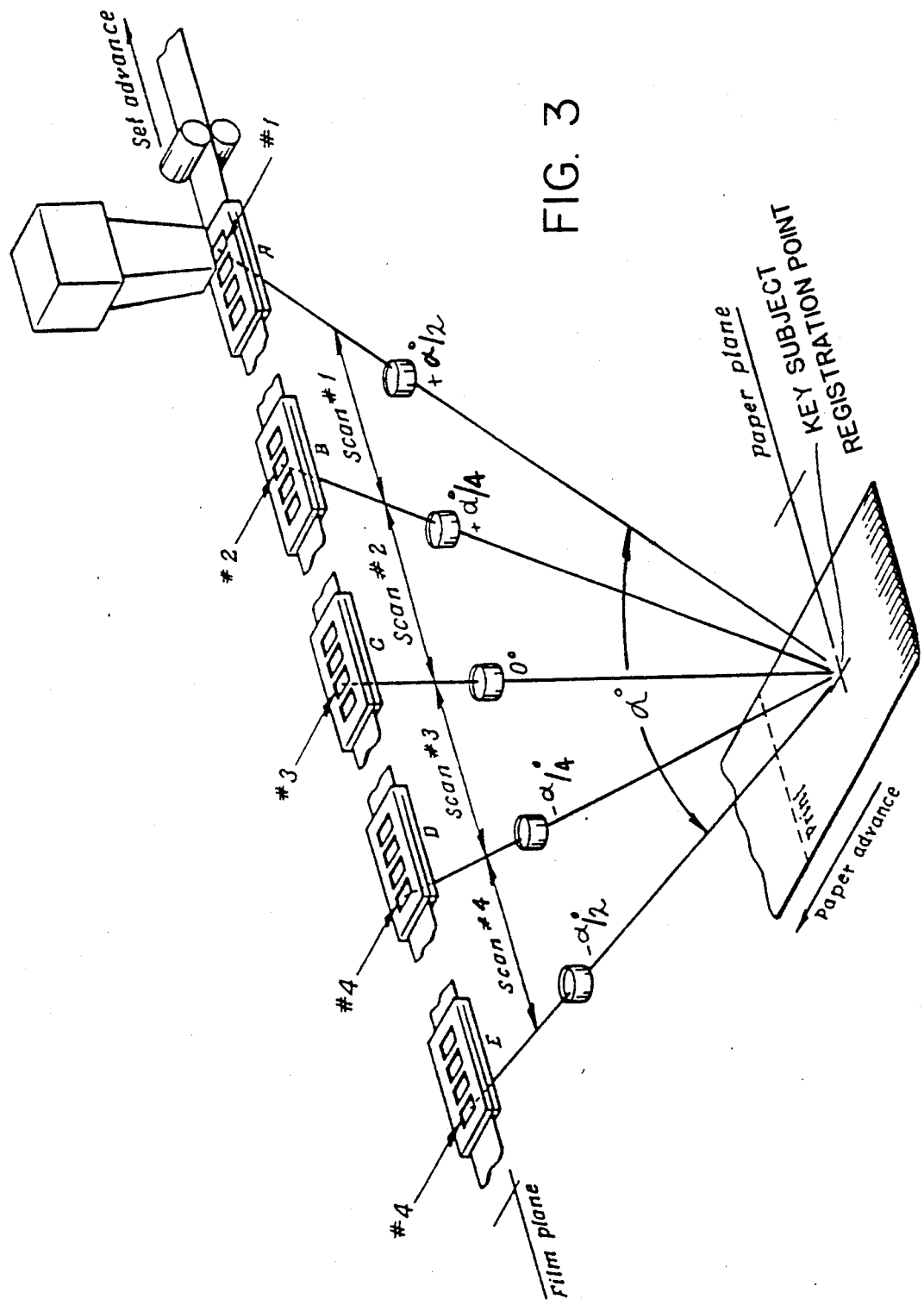
FIGS. 3 and 4 are pictorial, schematic drawings depicting how 2D images are composed to form line-formed images on lenticular stereogram prints.
Figure 4:
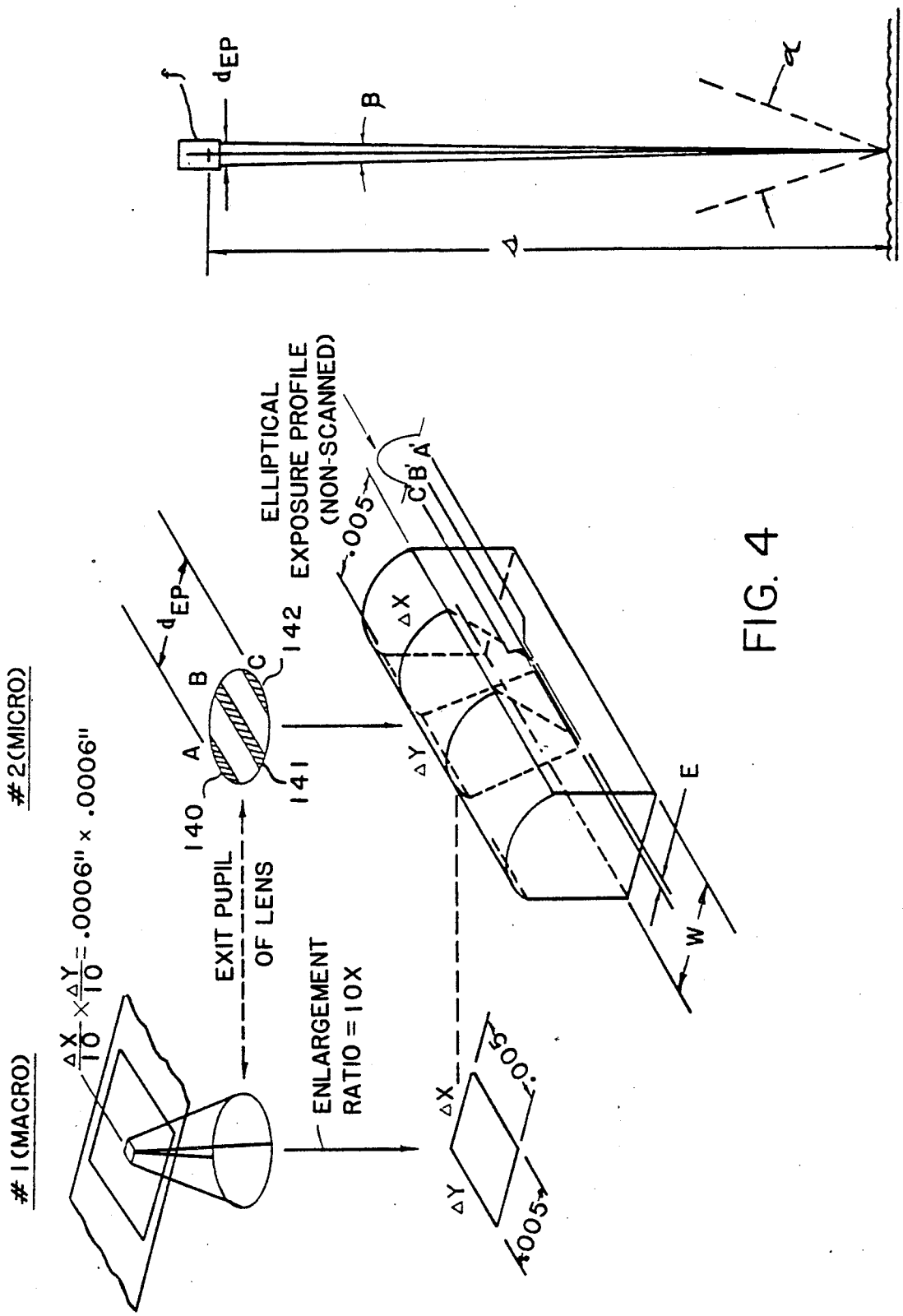

The printing of one 3-D frame set, again using the four frames previously edited (21, 22, 23, and 24) as an example, begins when the film is advanced and clamped to the film gate 104, as previously described in connection with the Edit Station. The printing lamphouse 101 is adjusted (by moving cyan, magenta, and yellow filters into the light path) to produce the required intensity and balance of red, green, and blue (R, G. B) light, as previously computed in the Edit Station. The printing lamphouse 101 is mounted on the scan carriage 109 and scans with it along the x-axis. The printing begins by exposure of the frame 21. The scan carriage will be moved along the x axis so that the central ray of light from the enlarging lens 140 to the center of print 143 will scan from position 127 to position 128. During the scan from 127 to 128, the shutter 138 is removed from the optical path to permit the light from the lamphouse 101 to illuminate frame 21 and be imaged by the lens 140 onto the surface of the print material 139. For purposes of illustration, the left eye pupil of a person in the picture is shown to lie at the centerline of print 143. Frame 21 is printed with no coordinate position correction; i.e., the film gate 104 and lens 133 are in the nominal "home" position which will be used for printing all subsequent frame-sets. When the central ray of light arrives at 128, the scan carriage 109 motion is stopped and the shutter 138 is closed to block any further exposure. In practice, a slight variation of the theoretical imaging process is employed in the printer stage. Because of the finite diameter $d_{EP}$ of the exit pupil (see FIG. 4), the opening of the shutter is delayed until the scan carriage 109 has moved a distance equal to approximately ½ the diameter of the exit pupil. The shutter is also closed at a distance of approximately ½ the diameter of the exit pupil before the theoretical end point of the scan of each frame. This is done primarily to prevent the overlapping of frame line-exposures behind the lenticules. These time delays are also used as a ramp-up and ramp-down period (acceleration and deceleration) for the scan motor 113.

The stepper motor 108 and the lead screw 107 are now used to move the film gate 104 along the x axis to bring frame 22 into position for printing. The length of the gate motion is equal to a constant (standard frame spacing) plus or minus $\Delta x_2$ previously determined in the Edit Station. In the y-axis direction, the stepper motor 115 and the lead screw 114 are used to move the lens a distance $k\Delta y_2$ where k is a factor used to correct for the fact that the lens is moved rather than the film in the y direction. The system is now aligned to register the key subject in frame 22 with its position in frame 21; i.e., the person's left eye will be printed in coordinate registration in the print 143. The shutter 138 is opened (see previous explanation of the delay in shutter opening), and the scan carriage 109 is moved smoothly to advance the central ray from 128 to 129, at which point the shutter 138 is again closed. This procedure is repeated for frames 23 and 24 using $\Delta x_3$, $\Delta y_3$, $\Delta x_4$, and $\Delta y_4$ with the central ray advancing from 129 to 130 and from 130 to 131. This completes the scanned exposure of the stereogram using a 4-frame input set with the last film frame stopping at 126. The procedure is repeated for the next 4-frame set but with scanning occurring in the reverse direction, i.e., starting with the fourth frame in the set and continuing to the first. (Print material 139 is, of course, advanced along the y axis before each printing cycle.) The computer calculates the stepper pulses for driving the stepper motor 108 to position each frame along the x axis, starting with frame $N_4$ and moving backwards, from the preset frame-to-frame x-axis stepper motor pulses and the $\Delta x$ pulses for each frame. Positioning of the lens for y-axis key subject registration for each frame is the same in both directions of scanned imaging.

I claim:

1. A dual-stage 3D printer for forming a latent line-formed photographic image on lenticular print film from a set of two or more frames of negative images $N_1$—$N_n$ of a scene in which a selected key subject of the scene is to be formed in the developed photographic image so as to appear to a viewer to be in the plane of the print comprising:

an edit station having means for generating image content data signals indicative of the locations and densities of a multiplicity of zones of the images of each frame $N_1$—$N_n$ of the set, means for receiving the image content data signals of one of the frames $N_1$ and visually displaying the image of frame $N_1$ for selection by an operator: of a key subject area of the image, means for selecting and processing the image content data signals for the key subject area of frame $N_1$ to produce key subject identifier signals distinctly indicative of the content and location of the key subject area of frame N1, and means for comparing selected portions of the image content data signals for each of the other frames $N_2$—$N_n$ with the identifier signals and generating registration data signals indicative of the location of the key subject area of the images of each of the frames $N_2$—$N_n$; and a print station having means for separately projecting the image in each frame $N_1$—$N_n$ onto the print film, and means for individually positioning each frame $N_2$—Nn for projection in response to the registration data signals for the individual frames $N_2$—$N_n$ such that the key subject of each frame $N_2$—$N_n$ is in register in the plane of the print film with the key subject in frame $N_1$.

2. A dual-stage 3D printer according to claim 1 wherein the means for generating image content data signals includes means for forming light images of the negative images along an optical path and means for receiving the light images and generating electrical signals therefrom.

3. A dual-stage 3D printer according to claim 1 wherein the image content data generating means includes light source means for sequentially projecting uniform and diffuse light through each of the frames $N_1$—$N_n$, a lens positioned to receive the light projected through each frame and form a light image and a CCD video camera positioned to receive the light image from the lens.

4. A dual-stage 3D printer according to claim 2 wherein the edit station further includes means for separately interposing red, green and blue filters in the optical path of the light images so as to obtain image color data signals indicative of the densities of red, green and blue components of the images in a matrix of zones of a frame of the set, and wherein the print station includes a lamphouse and lamphouse control means for controlling the red, green and blue components of the imaging illumination projected into the print film in response to the image color data signals.

5. A dual-stage 3D printer according to claim 4 wherein the image color data signals for each zone of the matrix are the average of a multiplicity of image color data signals indicative of the densities of red, green, and blue components of the images in a multiplicity of sub-zones of the respective zone.

6. A dual-stage 3D printer according to claim 1 wherein the frames of the negative set are arranged side by side on a film strip having a longitudinal axis x, wherein the registration data signals for each frame $N_2$—$N_n$ generated by the comparing means includes an x-axis component $\Delta x$ indicative of the differences along the x axis between the position of the key subject area in frame $N_1$ and the position along the x axis of the key subject area of the respective frames $N_2$—$N_n$, and wherein both the edit station and print station include a movable film gate receiving the film strip in a fixed position and drive means for moving the film gate along the x axis to advance it frame by frame in response to x-axis control signals, the x-axis control signals for moving the film gate of the print station for each frame $N_2$—$N_n$ being the sum of a preset x-axis control signal for moving the film gate of the edit station for that frame and the x-axis component $\Delta x$ of the registration data signals for that frame.

7. A dual-stage 3D printer according to claim 6 wherein the print station includes a projecting lens for directing the image of each frame onto the print film, and means for moving the projecting lens orthogonally to the x axis in the y-axis direction in response to a y-axis component $\Delta y$ of the registration data signals for each frame $N_2$—$N_n$ to register the image of key subject area in the print film in the y-axis direction.

8. A dual-stage 3D printer according to claim 3 wherein the identifier signals are output signals of a selected array of pixels of the CCD camera and are indicative of the densities of the images in a matrix of zones of the key subject area of frame $N_1$.

9. A dual-stage 3D printer according to claim 2 wherein the negative images to be printed are compiled into a continuous strip of film having a multiplicity of sets of negative images to be printed, each set being marked by a machine-readable marker on the strip located in a predetermined relation to frame $N_1$ of each set, and the edit station includes detecting means for reading the marker on the strip and producing a signal indicative of the position of frame $N_1$ of each set and film advance means for advancing the film to position frame $N_1$ of each set in the optical path in response to detection of the marker for that set.

10. A dual stage 3D printer according to claim 1 wherein the negative images to be printed are compiled into a continuous strip of film having a multiplicity of sets of negative images to be printed and the edit station and print station include separate film advance means for automatically advancing the film strip after processing of each image set, and further comprising a slack loop station between the edit station and the print station having means for holding a portion of the strip containing a varying number of image sets so that the print station can process prints on fully automated constant-time cycles while the edit station can operate on variable-time cycles involving operator intervention.

* * * * *